(12) United States Patent
Saraf et al.

(10) Patent No.: US 12,190,180 B2
(45) Date of Patent: **\*Jan. 7, 2025**

(54) SYSTEM AND METHOD FOR OBTAINING RESOURCE DATA USING GENERIC API

(71) Applicant: Rakuten Symphony, Inc., Tokyo (JP)

(72) Inventors: Rohit Saraf, Indore (IN); Prateek Chouhan, Indore (IN); Vipul Choure, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/910,639

(22) PCT Filed: Jul. 8, 2022

(86) PCT No.: PCT/US2022/036435
§ 371 (c)(1),
(2) Date: Sep. 9, 2022

(87) PCT Pub. No.: WO2024/010587
PCT Pub. Date: Jan. 11, 2024

(65) Prior Publication Data
US 2024/0202052 A1    Jun. 20, 2024

(51) Int. Cl.
*G06F 9/54*        (2006.01)

(52) U.S. Cl.
CPC .................................. *G06F 9/547* (2013.01)

(58) Field of Classification Search
None
See application file for complete search history.

(56) References Cited

PUBLICATIONS

Written Opinion for PCT/US2022/036435 dated Oct. 11, 2022.
International Search Report for PCT/US2022/036435 dated Oct. 11, 2022.

*Primary Examiner* — Craig C Dorais
(74) *Attorney, Agent, or Firm* — Sughrue Mion, PLLC

(57) ABSTRACT

A system for fetching resource data of parameters included in a view using a generic get data application programming interface (API) is provided. The system includes at least one processor configured to execute instructions to: make, from a first application, a get data API call for fetching the resource data, wherein an input of the get data API call includes a view identifier; obtain, in response to the API call, view details for the view, wherein the view details include identifiers of the parameters included in the view and identifiers of one or more tables in which the parameters are respectively included; send a request to a second application for resource data of at least one parameter, among the parameters, stored in at least one table associated with the second application, from among the one or more tables; and receive and display, on the view, the requested resource data.

20 Claims, 5 Drawing Sheets

SYSTEM AND METHOD FOR OBTAINING RESOURCE DATA USING GENERIC API

CROSS REFERENCE TO RELATED APPLICATIONS

This application is a National Stage of International Application No. PCT/US2022/036435 filed Jul. 8, 2022.

BACKGROUND

Databases may be used to store data for a variety of applications. For example, in business environments, databases may be used to store and manage job information, employee information, site information, and other related data for an application. The data may be input and/or viewed via different user interface views that store and/or fetch the data to/from the database tables.

A related art view building application may generate and configure different views for one or more other applications in an application platform (e.g., a cloud-based application platform for an enterprise or business). Each view corresponds to a screen, form, user interface, or page through which data may be input to respective fields (i.e., parameters) of the view and stored in one or more databases or tables of the one or more other applications, and/or data may be fetched from the one or more databases or tables and output for display on respective fields of the view. The related art view building application allows a user to generate or modify a view by configuring the fields to be included in the view, from among previously-registered fields corresponding to backend resource fields (e.g., database table columns) of the one or more other applications.

When a particular view is loaded for outputting data previously-stored (e.g., previously input) in one or more tables, the related art view building application must execute application programming interface (API) calls customized or written for that view. As a result, any change to the fields in the view requires changes in the APIs developed for the view to fetch resource data for the respective fields. In other words, if the view is modified to include one or more additional fields, then a custom API must be developed to fetch the resource data for the view. This increases code complexity and results in multiple API creation and integration into a view. Further, any changes to views in the related art view building application are time consuming and inconvenient to a user, due to the additional API customization and development that is required.

SUMMARY

According to embodiments, systems and methods are provided for executing a generic Get API for fetching resource data for a view, where the Get API can be generically integrated into any view for fetching respective resource data, thereby eliminating the need for and development of custom APIs to fetch resource data.

According to embodiments, a system for fetching resource data of parameters included in a view, includes: at least one memory storing instructions; and at least one processor configured to execute the instructions to: make, from a first application, a get data application programming interface (API) call for fetching the resource data of the parameters included in the view configured by the first application, wherein an input of the get data API call includes a view identifier corresponding to the view; obtain, in response to the get data API call, view details for the view, wherein the view details include identifiers of the parameters included in the view and identifiers of one or more tables in which the parameters are respectively included; send, based on the obtained view details, a request to a second application for resource data of at least one parameter, among the parameters, stored in at least one table associated with the second application, from among the one or more tables; and receive and display, on the view, the requested resource data, wherein the get data API is generic across a plurality of views including a plurality of different parameters.

The view details may be obtained from a database that maps views to corresponding parameters respectively included in the views as configured by the first application.

The at least one processor may be further configured to execute the instructions to obtain, based on the obtained view details, information of the second application from resource information pre-registered in the first application, the resource information mapping applications to tables respectively associated with the applications.

The one or more tables may include a plurality of tables respectively associated with a plurality of applications, including the second application and a third application; and the at least one processor may be further configured to execute the instructions to send the request to the second application and send another request to a third application for resource data of at least one other parameter, among the parameters, stored in at least one other table associated with the third application, from among the plurality of tables.

The get data API may combine the resource data of the at least one parameter and the resource data of the at least one other parameter into a single API response returned to the first application.

The plurality of applications may be a plurality of microservices.

The at least one processor may be further configured to execute the instructions to receive, in response to the get data API call, file information of a file attached to the view.

According to embodiments, a method, performed by at least one processor, for fetching resource data for a current view, includes: making, by a first application, a get data API call for fetching the resource data of parameters included in the view configured by the first application, wherein an input of the get data API call includes a view identifier corresponding to the view; obtaining, in response to the get data API call, view details for the view, wherein the view details include identifiers of the parameters included in the view and identifiers of one or more tables in which the parameters are respectively included; sending, based on the obtained view details, a request to a second application for resource data of at least one parameter, among the parameters, stored in at least one table associated with the second application, from among the one or more tables; and receiving and displaying, on the view, the requested resource data, wherein the get data API is generic across a plurality of views including a plurality of different parameters.

The view details may be obtained from a database that maps views to corresponding parameters respectively included in the views as configured by the first application.

The method may further include obtaining, based on the obtained view details, information of the second application from resource information pre-registered in the first application, the resource information mapping applications to tables respectively associated with the applications.

The one or more tables may include a plurality of tables respectively associated with a plurality of applications, including the second application and a third application; and the sending may include sending the request to the second application and sending another request to a third application for resource data of at least one other parameter, among the parameters, stored in at least one other table associated with the third application, from among the plurality of tables.

The get data API may combine the resource data of the at least one parameter and the resource data of the at least one other parameter into a single API response returned to the first application.

The plurality of applications may be a plurality of microservices.

The method may further include receiving, in response to the get data API call, file information of a file attached to the view.

According to embodiments, a non-transitory computer-readable recording medium has recorded thereon instructions executable by at least one processor to perform a method for fetching resource data of parameters included in a view, the method including: making, by a first application, a get data API call for fetching the resource data of parameters included in the view configured by the first application, wherein an input of the get data API call includes a view identifier corresponding to the view; obtaining, in response to the get data API call, view details for the view, wherein the view details include identifiers of the parameters included in the view and identifiers of one or more tables in which the parameters are respectively included; sending, based on the obtained view details, a request to a second application for resource data of at least one parameter, among the parameters, stored in at least one table associated with the second application, from among the one or more tables; and receiving and displaying, on the view, the requested resource data, wherein the get data API is generic across a plurality of views including a plurality of different parameters The view details may be obtained from a database that maps views to corresponding parameters respectively included in the views as configured by the first application.

The method may further include obtaining, based on the obtained view details, information of the second application from resource information pre-registered in the first application, the resource information mapping applications to tables respectively associated with the applications.

The one or more tables may include a plurality of tables respectively associated with a plurality of applications, including the second application and a third application; and the sending may include sending the request to the second application and sending another request to a third application for resource data of at least one other parameter, among the parameters, stored in at least one other table associated with the third application, from among the plurality of tables.

The get data API may combine the resource data of the at least one parameter and the resource data of the at least one other parameter into a single API response returned to the first application.

The plurality of applications may be a plurality of microservices.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein.

DETAILED DESCRIPTION

Figure 1:
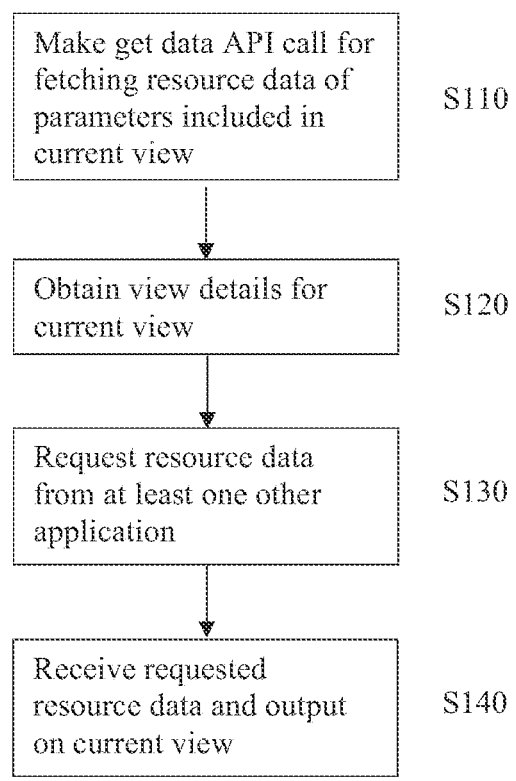
FIG. 1 illustrates a flowchart of a method for fetching resource data of parameters included in a view via a generic get data API, according to an embodiment.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and

[B]" or "at least one of [A] or [B]" are to be understood as including only A, only B, or both A and B.

Example embodiments of the present disclosure provide a method and system in which a generic GET (or get data) application programming interface (API) (e.g., an API for making a GET request) is integrated into a resource data viewing application (e.g., the above-described related art view building application) to fetch resource data from various resources (e.g., columns of tables). As a result, the same generic get data API may be used to fetch data from any of plural views and for any configuration or modification of a view, thereby eliminating the required development and attendant user inconvenience and time to configure views and mechanisms by which views fetch and display resource data.

Example embodiments of the present disclosure provide a method and system that executes backend logic and makes a generic get data API call to retrieve view details from a view configuration details table or database, and fetches resource data for a view based on the retrieved view details. As a result, different views may be configured and the same view may be modified with different parameters (or data fields) without requiring further API development or customization, thereby reducing multiple API creation and integration into views and minimizing code complexity, development time, and user inconvenience.

FIG. 1 illustrates a flowchart of a method 100 for fetching resource data of parameters included in a view via a generic get data API, according to an embodiment. The method 100 of FIG. 1 may be performed by at least one processor executing instructions stored in at least one memory.

Referring to FIG. 1, at operation S110, a first application makes or executes a get data API call for fetching resource data of parameters included in a view (i.e., current view) configured by the first application. The current view may be a view currently loaded or requested for display by the first application. The get data API call may receive as an input at least a view identifier corresponding to the view, though it is understood that other embodiments are not limited thereto. For example, the get data API call may also receive as an input an application identifier that identifies an application for which the view is configured. The input to and execution of the get data API call may be implemented by execution logic of the first application.

According to an embodiment, the first application (e.g., view building application) may be an application for configuring (e.g., building) and viewing different views for one or more other applications (e.g., one or more other applications integrated with or into the first application). The one or more other applications may be applications installed and deployed in an application platform, such as a cloud-based application platform for an enterprise or business. The one or more other applications and/or the first application may be deployed as containerized or microservices-based applications.

Each view configured by the first application may correspond to a screen, form, user interface, or page through which data may be input to respective parameters (i.e., data fields such as Name, Gender, Age, Address, Equipment Information, etc.) of the view and stored in one or more databases or tables of (or associated with) the one or more other applications, and/or data may be fetched from the one or more databases or tables and output for display on respective parameters of the view. The first application allows a user to configure (e.g., generate or modify) a view by selecting the parameters to be included in the view, from among parameters previously registered in the first application and corresponding to backend resource fields (e.g., table columns) of the one or more other applications. For example, the previously-registered parameters may be listed or otherwise displayed for selection in a view configuration screen of the first application, and dragged and dropped onto a view being configured.

Referring back to FIG. 1, at operation S120, view details for the view are obtained in response to the get data API call. For example, the get data API call may request and receive view details from a database or table (e.g., JavaScript Object Notation (JSON) database or table), where said view details correspond to or are mapped to a view identifier. To this end, a view details storage (e.g., JSON database, table(s), resource file, etc.) may map views to corresponding parameters respectively included in the views as configured via the first application. That is, based on a view being built or modified with various parameters in the first application, the first application stores those parameters in association with an identifier of the view (e.g., view name, index value, etc.) in the view details storage. Thus, based on the view identifier input to the get data API call, the corresponding view details for the current view are obtained from the view details storage.

According to an embodiment, the view details include identifiers of the parameters included in the current view. The view details may further include identifiers of one or more tables in which the parameters are respectively included, i.e., as columns (though it is understood that, in one or more other embodiments, the mapping of parameters to tables may be separately stored in a different table or storage and retrieved via separate logic). TABLE 1 below illustrates an example of view details mapped to a current view in the view details storage and obtained based on the get data API call:

TABLE 1

| Table 1 | Parameter 1, Parameter 2 |
| Table 2 | Parameter 3, Parameter 4 |
| Table 3 | Parameter 5, Parameter 6 |

As can be seen in the example of TABLE 1 above, the current view includes six parameters from three different tables. The view details are retrieved based on the generic get data API call to which the view name of the current view is input. Because the view details storage (e.g., database, table(s), resource file, etc.) stores the various parameters configured or included in each view, custom APIs for fetching resource data for a particular view or modification of the view are not required. Instead, the generic get data API in accordance with example embodiments may be universally used to retrieve view details for each view from the view details storage.

For example, if the current view per the example of TABLE 1 is later modified to include an additional parameter from another table, e.g., Parameter 7 from Table 4 as shown in TABLE 2 below, then this update would be reflected in the view details for the current view as stored in the view details storage and would be retrieved by the generic get data API call without any API development or customizations:

TABLE 2

| Table 1 | Parameter 1, Parameter 2 |
| Table 2 | Parameter 3, Parameter 4 |
| Table 3 | Parameter 5, Parameter 6 |
| Table 4 | Parameter 7 |

Referring back to FIG. 1, at operation S130, a request is sent based on the obtained view details to at least one other application (e.g., a second application and/or a third application) for resource data, of the parameters of the current view, stored in at least one table associated with the at least one other application. That is, based on the parameters of the current view identified in the obtained view details, the first application requests resource data (i.e., parameter values) of those parameters from the respective tables in which the resource data is stored. As the tables are associated with or included in the at least one other application (of the above-described one or more other applications), the request for the resource data is sent to the at least one other application. By way of example, the request may be implemented by backend logic of the first application that submits an HTTP request to an API of or for each application associated with or including a table mapped to a parameter of the current view.

At operation S140, the requested resource data is received by the first application and output (e.g., displayed) on the current view. The first application processes the resource data for output. For example, the first application (e.g., the backend API or logic, or get data API) combines or merges the resource data, which is returned (e.g., by the get data API) in a single API response. Accordingly, the returned values are output on the current view.

As set forth above, a method of fetching resource data of parameters included in a view is executed using a get data API that is generic across a plurality of views (and modifications of a view) including plurality of different parameters. Accordingly, customized logic or APIs do not need to be developed or deployed for each view or modification of a view.

Figure 2:
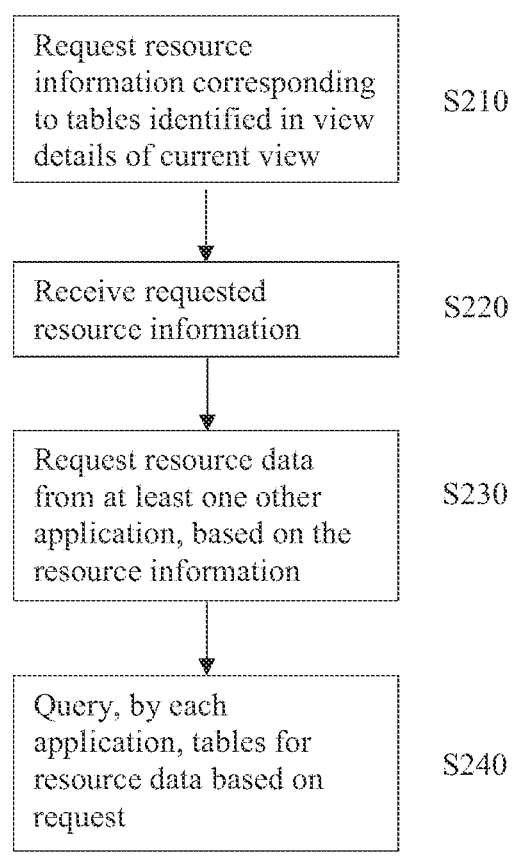
FIG. 2 illustrates a flowchart of a method for requesting resource data based on view details of a current view, according to an embodiment.

FIG. 2 illustrates a flowchart of a method 200 for requesting resource data based on view details of a current view, according to an embodiment. The method 200 of FIG. 2 may correspond to operation S130 shown in FIG. 1. Further, the method 200 of FIG. 2 may be performed by at least one processor executing instructions stored in at least one memory.

Referring to FIG. 2, at operation S210, resource information corresponding to parameters and/or tables identified in the view detail information for a current view is requested from a resource information storage (e.g., database(s), table(s), resource file(s), etc.). The resource information identifies the application(s) including or associated with the table(s) in which the parameters of the current view are stored. To this end, the resource information storage maps applications to tables respectively associated with the applications. Thus, the request includes identification information of each table corresponding to a current view (i.e., each table including a parameter included in the current view). The identification information is obtained based on the view detail information for the current view. The request may be made by backend logic of the first application, e.g., via a backend API call.

As set forth above, one or more other applications may be integrated into the first application such that views may be built for the other applications and/or such that views may be configured with parameters for inputting and/or viewing resource data stored in association with the other applications (e.g., stored in tables of or associated with the other applications). The tables included in (or associated with) each of the integrated applications may be previously registered in the first application, such as by including mapping information of the tables to their locations in the resource information storage (e.g., resource information table). Here, the locations may be the respective applications in which the tables are stored (or with which the tables are associated). For example, the resource information may be application or microservice information including at least one of an application name, a microservice name, a microservice path, etc. Thus, the resource information may be application or microservice information obtained for each table included or identified in the view details for a particular view. An example of the resource information obtained from the resource information storage based on the above TABLE 2 example of view details is provided in TABLE 3 below:

TABLE 3

| Table 1 | Microservice 1, path1 |
| Table 2 | Microservice 2, path2 |
| Table 3 | Microservice 3, path3 |
| Table 4 | Microservice 4, path4 |

Referring back to FIG. 2, in operation S220, resource information for the current view is received in response to the request. As set forth above, the resource information includes application information (e.g., at least one of application/microservice name, application/microservice path, etc.) of each application associated with or including a table(s) in which the parameters of the current view are stored.

At operation S230, based on the obtained resource information, a corresponding request for parameter values (or resource data) is made to each application or microservice that stores (or is associated with) the respective tables included or identified in the view details for the current view. The request may be made via a backend API (e.g., the same backend API through which the resource information table is queried) and/or logic of the first application. The request may be an HTTP request to an API of each individual application or microservice (e.g., a REST API). The request may include a query statement as a string input, where the query statement includes at least a table identifier or name (e.g., for each table, of the corresponding application/microservice, that is identified in the view details), a field or parameter identifier or name (e.g., for each parameter of the respective table(s) that is included in the view and identified in the view details), and a primary key value (e.g., for each table to be queried which may be provided as an entity map).

At operation S240, each application or microservice that receives its corresponding request may then query its table(s) based on the request. For example, an API (e.g., REST API) that receives the request may execute a database query (e.g., native database query, SQL query, etc.) based on the request (e.g., the string input) for each table identified or included in the request, and may return corresponding resource data (i.e., values of the parameters as stored in the table(s)). The resource data is returned to the first application (e.g., to the backend API and/or logic of the first application).

Figure 3:
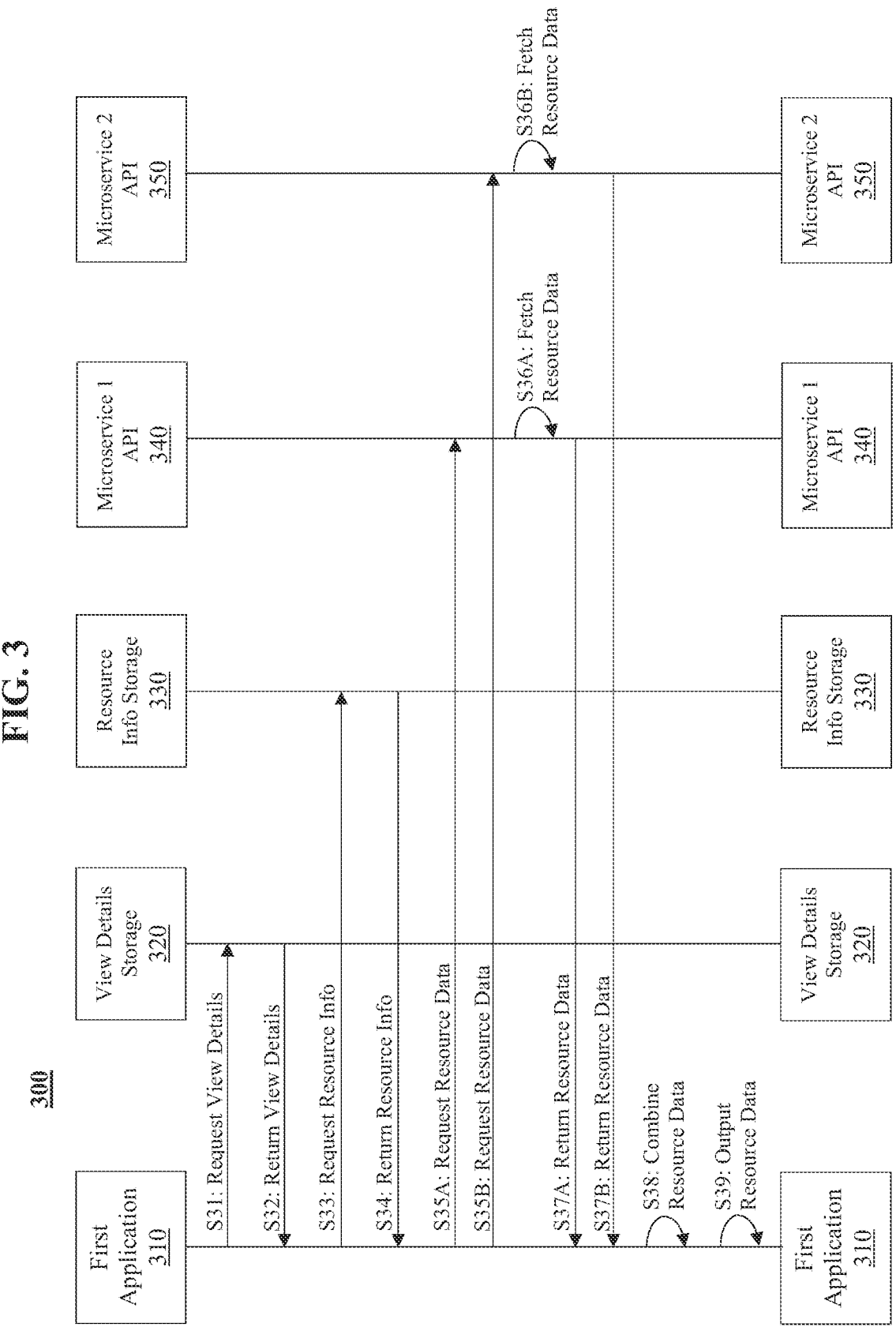
FIG. 3 illustrates a call flow diagram for fetching resource data of a current view according to an embodiment.

FIG. 3 illustrates a call flow diagram 300 for fetching resource data of a current view according to an embodiment.

The operations shown in FIG. 3 may be performed by at least one processor executing instructions stored in at least one memory.

Referring to FIG. 3, at S31, a first application 310 (e.g., view builder or data viewing application) requests view details for a current view from a view details storage 320. For example, the first application 310 may submit a request to a generic get data API according to example embodiments, for obtaining resource data of parameters included in a view (i.e., current view) configured by the first application. The request may include at least an identifier of the current view. The view details storage 320 may include a database, a table, a resource file, etc., in which views are mapped to corresponding view details respectively for the views. The view details include information on the parameters respectively included in the views, and may further include information on the tables in which those parameters are stored or included (e.g., as columns).

At S32, the view details for the current view are returned in response to the request. That is, based on the identifier of the current view included in the request, the corresponding view details may be read from the view details storage 320 and returned to the first application 310.

At S33, the first application requests or queries resource information corresponding to the view details, from a resource information storage 330 (e.g., database(s), table(s), resource file(s), etc.). The resource information identifies the application(s) including or associated with the table(s) in which the parameters of the current view are stored. To this end, the resource information storage 330 maps applications to tables (or parameters) respectively associated with the applications. Thus, the request includes identification information of each table (or each parameter) corresponding to a current view (i.e., each table including a parameter included in the current view). The identification information is obtained based on the view detail information for the current view. The request may be made by backend logic of the first application 310, e.g., via a backend API call.

At S34, the resource information for the current view is returned to the first application 310 in response to the request. For example, the resource information may be microservice information including at least one of a microservice name, a microservice path, etc. Thus, the resource information may be microservice information obtained for each table (or each parameter) included or identified in the view details for a particular view.

At S35A and S35B, the first application 310 (or backend API, the get data API, etc.) sends requests to respective APIs 340 and 350 of each microservice included or identified in the resource information, in order to fetch corresponding resource data (i.e., values of the parameters included in the current view) from the relevant tables (i.e., the tables in which parameters of the current view are stored). Each request may be an HTTP request to an API 340, 350 of each individual application or microservice (e.g., a REST API). The request may include a query statement as a string input, where the query statement includes at least a table identifier or name (e.g., for each table, of the corresponding application/microservice, that is identified in the view details), a field or parameter identifier or name (e.g., for each parameter of the respective table(s) that is included in the view and identified in the view details), and a primary key value (e.g., for each table to be queried). The request may include a mapping of parameters to tables.

At S36A and S36B, each microservice API 340, 350 fetches the requested resource data from the respective tables. For example, each API 340, 350 that receives the request may execute a database query (e.g., native database query, SQL query, etc.) based on the request (e.g., the string input) for each table identified or included in the request, and may return corresponding resource data (i.e., values of the parameters as stored in the table(s)).

At S37A and S37B, the resource data is returned by the microservice APIs 340, 350 to the first application 310 (e.g., to the backend API, the get data API, and/or logic of the first application 310).

At S38, the first application 310 (e.g., the backend API or logic, or get data API) combines or merges the resource data, which may be returned (e.g., by the get data API) in a single API response. At S39, the first application 310 outputs the resource data on a current view.

The parameters included in the view may include data values (e.g., as input to the view via a text or character input, a drop down menu selection, a radio button selection, etc.). Further, in one or more embodiments, a view may include one or more attachments (e.g., files or documents). In this case, the get data API call may also retrieve file information (e.g., file path or directory information, file location information, etc.) of the attachment attached to the view. For example, the file information may be stored in a table included in or associated with an application, and may be included in the response to the request (e.g., HTTP request) for resource data of a current view.

Figure 4:
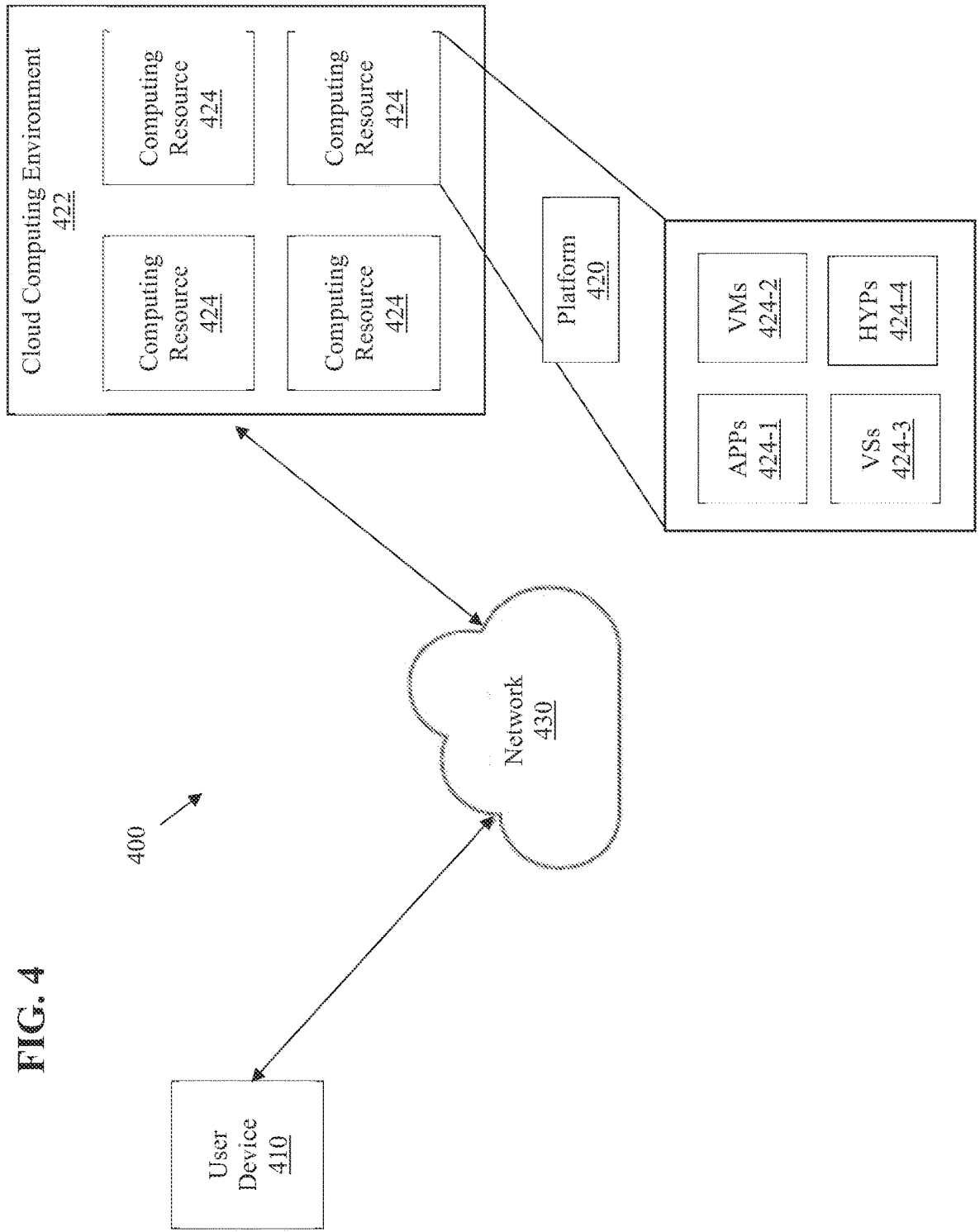
FIG. 4 is a diagram of an example environment in which systems and/or methods, described herein, may be implemented.

FIG. 4 is a diagram of an example environment 400 in which systems and/or methods, described herein, may be implemented. As shown in FIG. 4, environment 400 may include a user device 410, a platform 420, and a network 430. Devices of environment 400 may interconnect via wired connections, wireless connections, or a combination of wired and wireless connections. In embodiments, any of the functions and operations described with reference to FIGS. 1 through 3 above may be performed by any combination of elements illustrated in FIG. 4.

User device 410 includes one or more devices capable of receiving, generating, storing, processing, and/or providing information associated with platform 420. For example, user device 410 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 410 may receive information from and/or transmit information to platform 420.

Platform 420 includes one or more devices capable of receiving, generating, storing, processing, and/or providing information. In some implementations, platform 420 may include a cloud server or a group of cloud servers. In some implementations, platform 420 may be designed to be modular such that certain software components may be swapped in or out depending on a particular need. As such, platform 420 may be easily and/or quickly reconfigured for different uses.

In some implementations, as shown, platform 420 may be hosted in cloud computing environment 422. Notably, while implementations described herein describe platform 420 as being hosted in cloud computing environment 422, in some implementations, platform 420 may not be cloud-based (i.e., may be implemented outside of a cloud computing environment) or may be partially cloud-based.

Cloud computing environment 422 includes an environment that hosts platform 420. Cloud computing environment 422 may provide computation, software, data access, storage, etc., services that do not require end-user (e.g., user device 410) knowledge of a physical location and configuration of system(s) and/or device(s) that hosts platform 420. As shown, cloud computing environment 422 may include a group of computing resources 424 (referred to collectively as "computing resources 424" and individually as "computing resource 424").

Computing resource 424 includes one or more personal computers, a cluster of computing devices, workstation computers, server devices, or other types of computation and/or communication devices. In some implementations, computing resource 424 may host platform 420. The cloud resources may include compute instances executing in computing resource 424, storage devices provided in computing resource 424, data transfer devices provided by computing resource 424, etc. In some implementations, computing resource 424 may communicate with other computing resources 424 via wired connections, wireless connections, or a combination of wired and wireless connections.

As further shown in FIG. 4, computing resource 424 includes a group of cloud resources, such as one or more applications ("APPs") 424-1, one or more virtual machines ("VMs") 424-2, virtualized storage ("VSs") 424-3, one or more hypervisors ("HYPs") 424-4, or the like.

Application 424-1 includes one or more software applications that may be provided to or accessed by user device 410. Application 424-1 may eliminate a need to install and execute the software applications on user device 410. For example, application 424-1 may include software associated with platform 420 and/or any other software capable of being provided via cloud computing environment 422. In some implementations, one application 424-1 may send/receive information to/from one or more other applications 424-1, via virtual machine 424-2.

Virtual machine 424-2 includes a software implementation of a machine (e.g., a computer) that executes programs like a physical machine. Virtual machine 424-2 may be either a system virtual machine or a process virtual machine, depending upon use and degree of correspondence to any real machine by virtual machine 424-2. A system virtual machine may provide a complete system platform that supports execution of a complete operating system ("OS"). A process virtual machine may execute a single program, and may support a single process. In some implementations, virtual machine 424-2 may execute on behalf of a user (e.g., user device 410), and may manage infrastructure of cloud computing environment 422, such as data management, synchronization, or long-duration data transfers.

Virtualized storage 424-3 includes one or more storage systems and/or one or more devices that use virtualization techniques within the storage systems or devices of computing resource 424. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 424-4 may provide hardware virtualization techniques that allow multiple operating systems (e.g., "guest operating systems") to execute concurrently on a host computer, such as computing resource 424. Hypervisor 424-4 may present a virtual operating platform to the guest operating systems, and may manage the execution of the guest operating systems. Multiple instances of a variety of operating systems may share virtualized hardware resources.

Network 430 includes one or more wired and/or wireless networks. For example, network 430 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
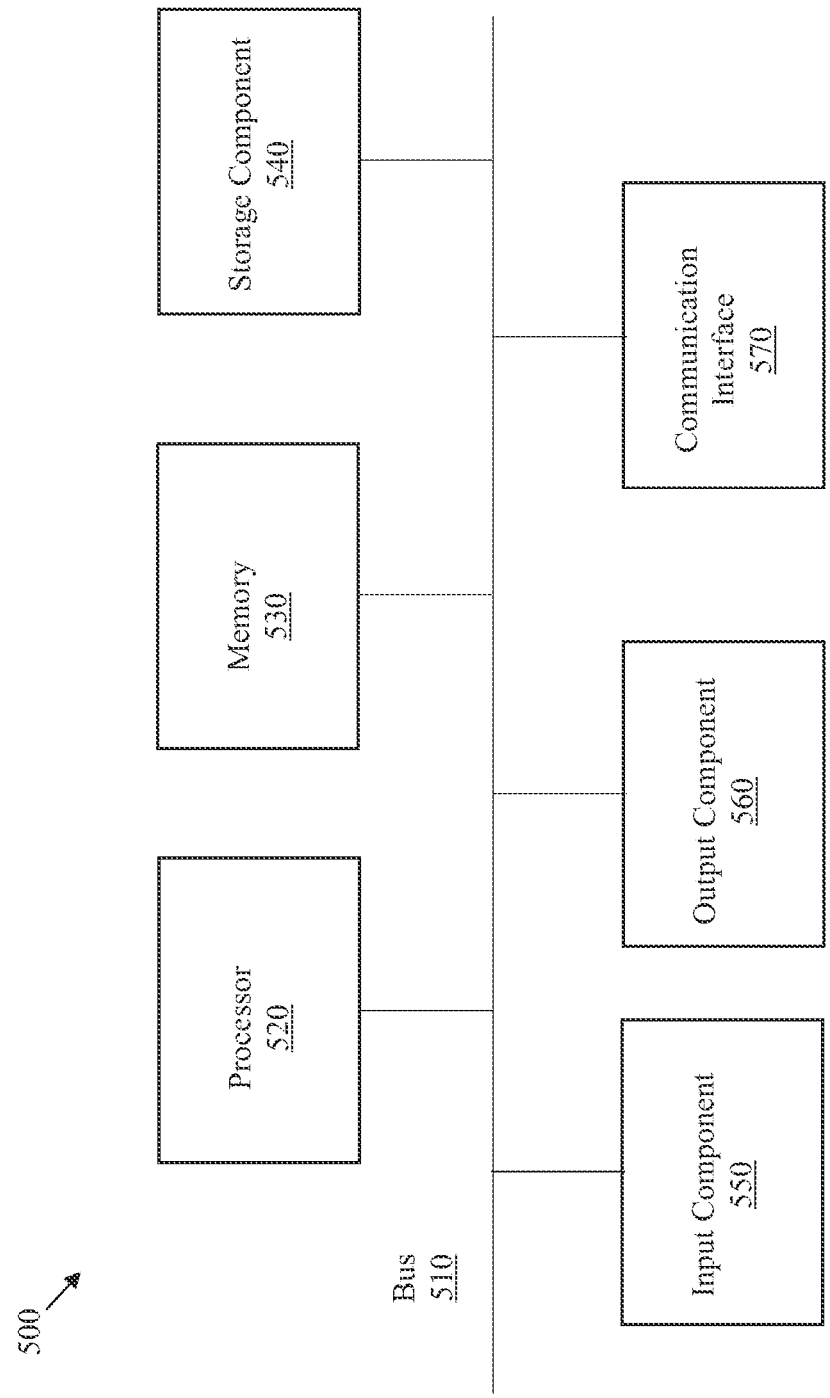
FIG. 5 is a diagram of example components of a device according to an embodiment.

FIG. 5 is a diagram of example components of a device 500. Device 500 may correspond to user device 410 and/or platform 420. As shown in FIG. 5, device 500 may include a bus 510, a processor 520, a memory 530, a storage component 540, an input component 550, an output component 560, and a communication interface 570.

Bus 510 includes a component that permits communication among the components of device 500. Processor 520 may be implemented in hardware, firmware, or a combination of hardware and software. Processor 520 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator).

Output component 560 includes a component that provides output information from device 500 (e.g., a display, a speaker, and/or one or more light-emitting diodes (LEDs)).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, or the like.

Device 500 may perform one or more processes described herein. Device 500 may perform these processes in response to processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

In embodiments, any one of the operations or processes of FIGS. 1 through 3 may be implemented by or using any one of the elements illustrated in FIGS. 4 and 5.

In accordance with example embodiments, a generic get data API is integrated into a resource data viewing application to fetch resource data from various resources (e.g., columns of tables). As a result, the same generic get data API may be used to fetch data from any of plural views and for any configuration or modification of a view, thereby eliminating the required development and attendant user inconvenience and time to configure views and configure mechanisms by which views fetch and display resource data.

Further, in accordance with example embodiments, a data viewing application may execute generic logic to retrieve view details of a current view from a view configuration details table or database, and fetch resource data for the current view based on the retrieved view details. As a result, different views may be configured and the same view may be modified with different parameters (or data fields) without requiring further API development or customization, thereby reducing multiple API creation and integration into views and minimizing code complexity, development time, and user inconvenience The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A system for fetching resource data of parameters included in a view, the system comprising:
    at least one memory storing instructions; and
    at least one processor configured to execute the instructions to:
        make, from a first application, a get data application programming interface (API) call for fetching the resource data of the parameters included in the view configured by the first application, wherein an input of the get data API call comprises a view identifier corresponding to the view;
        obtain, in response to the get data API call, view details for the view, wherein the view details comprise identifiers of the parameters included in the view and identifiers of one or more tables in which the parameters are respectively included;
        send, based on the obtained view details, a request to a second application for resource data of at least one parameter, among the parameters, stored in at least one table associated with the second application, from among the one or more tables; and
        receive and display, on the view, the requested resource data,
    wherein the get data API is generic across a plurality of views including a plurality of different parameters.

2. The system as claimed in claim 1, wherein the view details are obtained from a database that maps views to corresponding parameters respectively included in the views as configured by the first application.

3. The system as claimed in claim 1, wherein the at least one processor is further configured to execute the instructions to obtain, based on the obtained view details, information of the second application from resource information pre-registered in the first application, the resource information mapping applications to tables respectively associated with the applications.

4. The system as claimed in claim 1, wherein:
    the one or more tables comprises a plurality of tables respectively associated with a plurality of applications, including the second application and a third application; and
    the at least one processor is further configured to execute the instructions to send the request to the second application and send another request to a third application for resource data of at least one other parameter, among the parameters, stored in at least one other table associated with the third application, from among the plurality of tables.

5. The system as claimed in claim 4, wherein the get data API combines the resource data of the at least one parameter and the resource data of the at least one other parameter into a single API response returned to the first application.

6. The system as claimed in claim 4, wherein the plurality of applications is a plurality of microservices.

7. The system as claimed in claim 1, wherein the at least one processor is further configured to execute the instructions to receive, in response to the get data API call, file information of a file attached to the view.

8. A method, performed by at least one processor, for fetching resource data of parameters included in a view, the method comprising:

making, by a first application, a get data API call for fetching the resource data of parameters included in the view configured by the first application, wherein an input of the get data API call comprises a view identifier corresponding to the view;

obtaining, in response to the get data API call, view details for the view, wherein the view details comprise identifiers of the parameters included in the view and identifiers of one or more tables in which the parameters are respectively included;

sending, based on the obtained view details, a request to a second application for resource data of at least one parameter, among the parameters, stored in at least one table associated with the second application, from among the one or more tables; and receiving and displaying, on the view, the requested resource data, wherein the get data API is generic across a plurality of views including a plurality of different parameters.

9. The method as claimed in claim 8, wherein the view details are obtained from a database that maps views to corresponding parameters respectively included in the views as configured by the first application.

10. The method as claimed in claim 8, further comprising obtaining, based on the obtained view details, information of the second application from resource information pre-registered in the first application, the resource information mapping applications to tables respectively associated with the applications.

11. The method as claimed in claim 8, wherein:

the one or more tables comprises a plurality of tables respectively associated with a plurality of applications, including the second application and a third application; and the sending comprises sending the request to the second application and sending another request to a third application for resource data of at least one other parameter, among the parameters, stored in at least one other table associated with the third application, from among the plurality of tables.

12. The method as claimed in claim 11, wherein the get data API combines the resource data of the at least one parameter and the resource data of the at least one other parameter into a single API response returned to the first application.

13. The method as claimed in claim 11, wherein the plurality of applications is a plurality of microservices.

14. The method as claimed in claim 8, further comprising receiving, in response to the get data API call, file information of a file attached to the view.

15. A non-transitory computer-readable recording medium having recorded thereon instructions executable by at least one processor to perform a method for fetching resource data of parameters included in a view, the method comprising:

making, by a first application, a get data API call for fetching the resource data of parameters included in the view configured by the first application, wherein an input of the get data API call comprises a view identifier corresponding to the view;

obtaining, in response to the get data API call, view details for the view, wherein the view details comprise identifiers of the parameters included in the view and identifiers of one or more tables in which the parameters are respectively included;

sending, based on the obtained view details, a request to a second application for resource data of at least one parameter, among the parameters, stored in at least one table associated with the second application, from among the one or more tables; and receiving and displaying, on the view, the requested resource data, wherein the get data API is generic across a plurality of views including a plurality of different parameters.

16. The non-transitory computer-readable recording medium as claimed in claim 15, wherein the view details are obtained from a database that maps views to corresponding parameters respectively included in the views as configured by the first application.

17. The non-transitory computer-readable recording medium as claimed in claim 15, wherein the method further comprises obtaining, based on the obtained view details, information of the second application from resource information pre-registered in the first application, the resource information mapping applications to tables respectively associated with the applications.

18. The non-transitory computer-readable recording medium as claimed in claim 15, wherein:

the one or more tables comprises a plurality of tables respectively associated with a plurality of applications, including the second application and a third application; and the sending comprises sending the request to the second application and sending another request to a third application for resource data of at least one other parameter, among the parameters, stored in at least one other table associated with the third application, from among the plurality of tables.

19. The non-transitory computer-readable recording medium as claimed in claim 18, wherein the get data API combines the resource data of the at least one parameter and the resource data of the at least one other parameter into a single API response returned to the first application.

20. The non-transitory computer-readable recording medium as claimed in claim 18, wherein the plurality of applications is a plurality of microservices.

\* \* \* \* \*